(12) United States Patent
Sugiyama

(10) Patent No.: US 12,547,154 B2
(45) Date of Patent: Feb. 10, 2026

(54) SUBSTRATE PROCESSING APPARATUS AND NON-TRANSITORY COMPUTER READABLE MEDIUM

(71) Applicant: EBARA CORPORATION, Tokyo (JP)

(72) Inventor: Mitsunori Sugiyama, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 397 days.

(21) Appl. No.: 18/358,953

(22) Filed: Jul. 26, 2023

(65) Prior Publication Data

US 2024/0045405 A1 Feb. 8, 2024

(30) Foreign Application Priority Data

Aug. 5, 2022 (JP) .................................. 2022-125311

(51) Int. Cl.
G05B 19/4155 (2006.01)
(52) U.S. Cl.
CPC ............... *G05B 19/4155* (2013.01); *G05B 2219/40066* (2013.01)
(58) Field of Classification Search
None
See application file for complete search history.

(56) References Cited

U.S. PATENT DOCUMENTS

| | | | | |
|---|---|---|---|---|
| 2009/0132078 | A1* | 5/2009 | Sakano | G05B 19/41875 700/103 |
| 2015/0290766 | A1* | 10/2015 | Sugiyama | B24B 53/007 451/444 |
| 2018/0001440 | A1* | 1/2018 | Aono | H01L 21/68707 |
| 2018/0350638 | A1* | 12/2018 | Kaga | C23C 16/45544 |

FOREIGN PATENT DOCUMENTS

JP 6370084 8/2018

\* cited by examiner

*Primary Examiner* — David Earl Ogg
(74) *Attorney, Agent, or Firm* — JCIPRNET

(57) ABSTRACT

A control device of a substrate processing apparatus is configured to execute: calculating patterns for changing an order of loading to the substrate processing apparatus for multiple substrates loaded to the substrate processing apparatus; generating, for each obtained pattern, a time table in which process end times in the polishing device, the cleaning device, and the transport device are associated, so that an idling state does not occur from a time when the substrates are loaded to the substrate processing apparatus until a cleaning process ends; selecting a time table with a shortest time from a time when a process of a substrate initially loaded to the substrate processing apparatus starts until a process of a lastly loaded substrate ends in the obtained time tables; and controlling timings of loading the substrates to the substrate processing apparatus based on the selected time table.

6 Claims, 10 Drawing Sheets

| No. 1 | Poli.A | Poli.B | CL1A | CL2A | CL3A |
| No. 2 | Poli.B | CL1A | CL2A | CL3A | | |
| No. 3 | Poli.A | CL1A | CL2A | CL3A | | |
| No. 4 | Poli.A | Poli.B | CL1A | CL2A | CL3A |
| No. 5 | Poli.A | Poli.B | CL1A | CL2A | CL3A |
| No. 6 | Poli.A | Poli.B | CL1A | CL2A | CL3A |

FIG. 8

SUBSTRATE PROCESSING APPARATUS AND NON-TRANSITORY COMPUTER READABLE MEDIUM

CROSS-REFERENCE TO RELATED APPLICATION

This application claims the priority benefit of Japan application serial No. 2022-125311, filed on Aug. 5, 2022. The entirety of the above-mentioned patent application is hereby incorporated by reference herein and made a part of this specification.

BACKGROUND

Technical Field

The invention relates to a substrate processing apparatus and a program.

Description of Related Art

In recent years, a substrate processing apparatus for performing various processes on substrates is known (e.g., Japanese Patent No. 6370084). Specifically, such substrate processing apparatus includes: a polishing unit including at least one polishing device performing a polishing process on a substrate; a cleaning unit including at least one cleaning device performing a cleaning process on the substrate polished by the polishing unit; and a transport unit including at least one transport device performing a transport process on the substrate.

In the case where multiple substrates are transported continuously in the substrate processing apparatus, a substrate idling state may occur due to waiting for a process on a preceding substrate or waiting for a free processing apparatus shared with a substrate transported by a different route. For example, when the substrate idling state occurs from the time when the polishing process starts until the cleaning process ends, the state of the substrate may become unstable due to aging (corrosion, etc.) or disturbance (dust, etc.). Specifically, in the case where the polishing object of the substrate includes copper (Cu), the influence of corrosion increases if the idling time after the polishing ends until the cleaning starts is long.

Regarding this, Patent Document 1 proposes a technique of generating a time table in which the process end times in the polishing device, the cleaning device, and the transport device are associated for each of multiple substrates loaded to the substrate processing apparatus so that the idling state does not occur from the time when the substrates are loaded to the substrate processing apparatus until the cleaning process ends, and controlling the loading timings of the substrates to the substrate processing apparatus based on the generated time table. According to such technique, the substrate idling state from the time of being loaded to the substrate processing apparatus until the cleaning process ends can be reduced.

However, in the case of the conventional technique, the order of loading substrates into the substrate processing apparatus is fixed. In other words, it is not configured so that calculation can be performed by changing the order in which the substrates are loaded to the substrate processing apparatus. Therefore, there is still room for improvement from the perspective of reducing the time from the time when the process on a substrate initially loaded to the substrate processing apparatus starts until the process lastly loaded to the substrate processing apparatus ends, that is, the "total processing time" of multiple substrates, in the conventional technique.

SUMMARY

An aspect of the invention provides a substrate processing apparatus. The substrate processing apparatus includes: a polishing unit, including at least one polishing device that performs a polishing process on a substrate; a cleaning unit, including at least one cleaning device that performs a cleaning process on the substrate polished by the polishing unit; a transport unit, including at least one transport device that performs a transport process on the substrate; and a control device, controlling the substrate processing apparatus. The control device is configured to execute: a calculation control process, calculating patterns for changing an order of loading to the substrate processing apparatus for a plurality of substrates loaded to the substrate processing apparatus based on a processing recipe in which processing contents applied to each of the substrates loaded to the substrate processing apparatus are defined in advance; a time table generation control process, generating, for each of the patterns obtained in the calculation control process, a time table in which process end times in the polishing device, the cleaning device, and the transport device are associated, so that an idling state does not occur from a time when the substrates are loaded to the substrate processing apparatus until a cleaning process ends; a selection control process, selecting a time table with a shortest time from a time when a process of a substrate initially loaded to the substrate processing apparatus starts until a process of a substrate that is lastly loaded ends in the time tables obtained in the time table generation control process; and a timing control process, controlling timings of loading the substrates to the substrate processing apparatus based on the time table selected in the selection control process.

Another aspect of the invention provides a non-transitory computer readable medium storing a program. The program causes a computer to execute a control process, and the control process includes: a calculation control process, calculating patterns for changing an order of loading to a substrate processing apparatus for a plurality of substrates loaded to the substrate processing apparatus based on a processing recipe in which processing contents applied to each of the substrates loaded to the substrate processing apparatus are defined in advance; a time table generation control process, generating, for each of the patterns obtained in the calculation control process, a time table in which process end times in a polishing device, a cleaning device, and a transport device provided in the substrate processing apparatus are associated, so that an idling state does not occur from a time when the substrates are loaded to the substrate processing apparatus until a cleaning process ends; a selection control process, selecting a time table with a shortest time from a time when a process of a substrate initially loaded to the substrate processing apparatus starts until a process of a substrate that is lastly loaded ends in the time tables obtained in the time table generation control process; and a timing control process, controlling timings of loading the substrates to the substrate processing apparatus based on the time table selected in the selection control process.

BRIEF DESCRIPTION OF THE DRAWINGS

FIG. 8 is a diagram illustrating an example of a processing recipe of Substrates No. 1 to No. 6 used in the embodiment.

DESCRIPTION OF THE EMBODIMENTS

Figure 1:
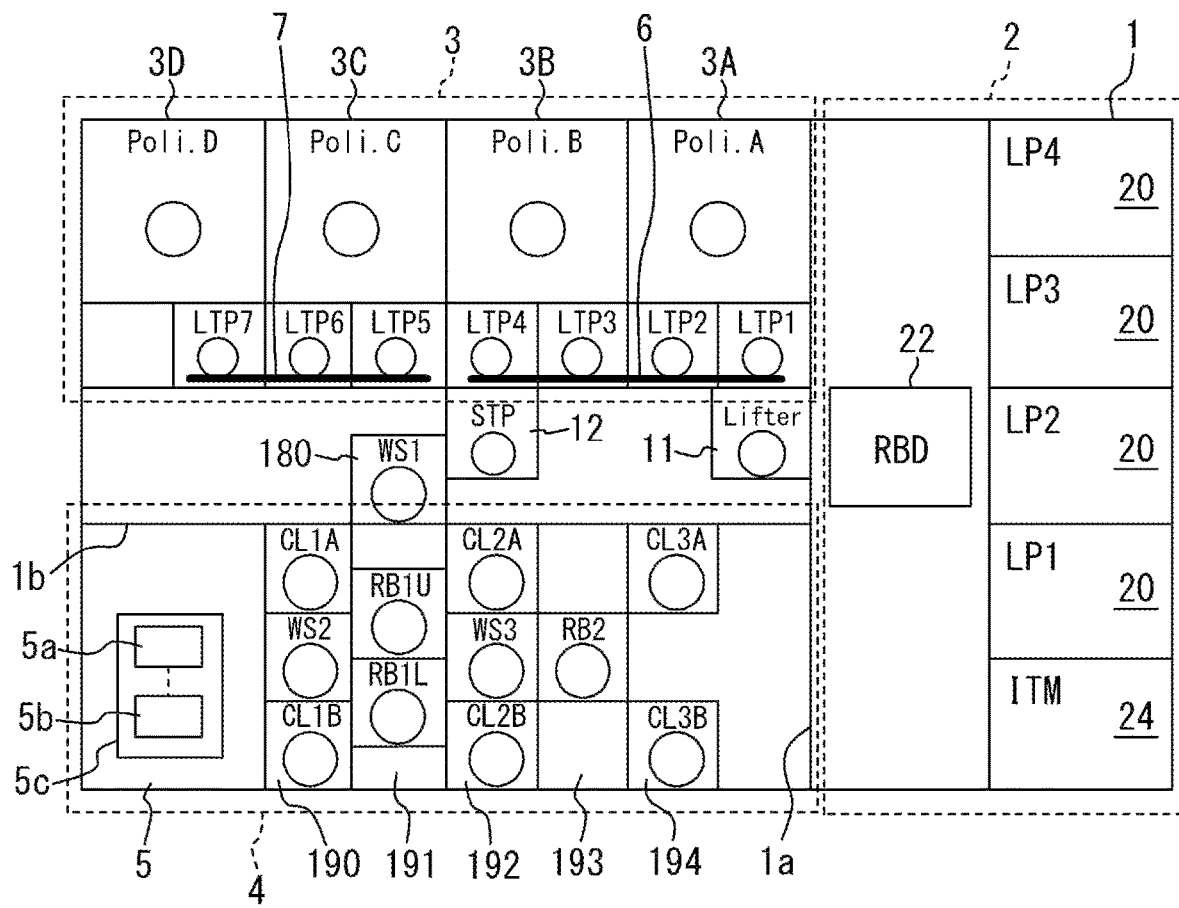
FIG. 1 is a plan view illustrating an overall configuration of a substrate processing apparatus according to an embodiment.

The invention provides a technique capable of reducing the total processing time of multiple substrates.

Aspect 1

In order to achieve the above objective, an aspect of the invention provides a substrate processing apparatus. The substrate processing apparatus includes: a polishing unit, including at least one polishing device that performs a polishing process on a substrate; a cleaning unit, including at least one cleaning device that performs a cleaning process on the substrate polished by the polishing unit; a transport unit, including at least one transport device that performs a transport process on the substrate; and a control device, controlling the substrate processing apparatus. The control device is configured to execute: a calculation control process, calculating patterns for changing an order of loading to the substrate processing apparatus for a plurality of substrates loaded to the substrate processing apparatus based on a processing recipe in which processing contents applied to each of the substrates loaded to the substrate processing apparatus are defined in advance; a time table generation control process, generating, for each of the patterns obtained in the calculation control process, a time table in which process end times in the polishing device, the cleaning device, and the transport device are associated, so that an idling state does not occur from a time when the substrates are loaded to the substrate processing apparatus until a cleaning process ends; a selection control process, selecting a time table with a shortest time from a time when a process of a substrate initially loaded to the substrate processing apparatus starts until a process of a substrate that is lastly loaded ends in the time tables obtained in the time table generation control process; and a timing control process, controlling timings of loading the substrates to the substrate processing apparatus based on the time table selected in the selection control process.

According to the aspect, the time from the time when the process of the substrate initially loaded to the substrate processing apparatus starts until the process of the substrate that is lastly loaded ends, that is, the total processing time of the substrates, can be reduced while reducing the idling state between the time when the substrates are loaded to the substrate processing apparatus until the cleaning process ends.

Aspect 2

In the substrate processing apparatus according to Aspect 1, it may also be that the at least one polishing device includes a plurality of polishing devices able to execute polishing processes of a same type, the polishing devices include a specific polishing device group formed by a plurality of polishing devices replaceable with each other, in the processing recipe, in a case where some of the substrates loaded to the substrate processing apparatus include a polishing process performed by the specific polishing device group in applied processing contents, the control device is configured to execute a processing recipe change control process, and in the processing recipe change control process, the control device is configured to: generate an additional processing recipe defining processing contents in a case where a plurality of polishing devices included in the specific polishing device group are replaced by another plurality of polishing devices for a substrate loaded to the substrate processing apparatus after a substrate in which processing contents applied to the substrate do not include the polishing process performed by the specific polishing device group among the substrates loaded to the substrate processing apparatus, add the additional processing recipe that is generated to the processing recipe, and the control device is configured to perform the calculation control process based on a processing recipe obtained in the processing recipe change control process.

According to the aspect, the additional processing recipe in the case where multiple polishing devices included in the specific polishing device group are replaced with other polishing devices is further considered, and the total processing time of the substrates can be reduced.

Aspect 3

In the substrate processing apparatus according to Aspect 1 or Aspect 2, it may also be that, in the time table generation control process, the control device is configured to generate the time table based on past performance of a time required for a process in at least one of the polishing device and the cleaning device and a time required for a transport process in the transport device from the polishing unit to the cleaning unit.

Aspect 4

In the substrate processing apparatus according to any one of Aspects 1 to 3, it may also be that, in the time table generation control process, at a time of generating the time table for a substrate newly loaded to the substrate processing apparatus, the control device is configured to: calculate tentative arrival times of the newly loaded substrate at the polishing device, the cleaning device, and the transport device, and compare the tentative arrival times with process end times or scheduled process end times of a substrate loaded in advance to the substrate processing apparatus in the polishing device, the cleaning device, and the transport device, in a case where there is a tentative arrival time earlier than the process end time or the scheduled process end time in a same or competing processing device, generate actual arrival times by adding a difference between the earlier tentative arrival time and the process end time or the scheduled process end time to the tentative arrival times at the polishing device, the cleaning device, and the transport device, and generate the time table based on the actual arrival times.

Aspect 5

In the substrate processing apparatus according to Aspect 4, it may also be that, in the time table generation control process, in a case where there is no tentative arrival time earlier than the process end time or the scheduled process end time in the same or competing processing device, the control device is configured to generate the time table based on the tentative arrival times.

Aspect 6

In order to achieve the above objective, an aspect of the invention provides a program. The program causes a computer to execute a control process, and the control process includes: a calculation control process, calculating patterns for changing an order of loading to a substrate processing apparatus for a plurality of substrates loaded to the substrate processing apparatus based on a processing recipe in which processing contents applied to each of the substrates loaded to the substrate processing apparatus are defined in advance; a time table generation control process, generating, for each of the patterns obtained in the calculation control process, a time table in which process end times in a polishing device, a cleaning device, and a transport device provided in the substrate processing apparatus are associated, so that an idling state does not occur from a time when the substrates are loaded to the substrate processing apparatus until a cleaning process ends; a selection control process, selecting a time table with a shortest time from a time when a process of a substrate initially loaded to the substrate processing apparatus starts until a process of a substrate that is lastly loaded ends in the time tables obtained in the time table generation control process; and a timing control process, controlling timings of loading the substrates to the substrate processing apparatus based on the time table selected in the selection control process.

According to the aspect, the time from the time when the process of the substrate initially loaded to the substrate processing apparatus starts until the process of the substrate that is lastly loaded ends, that is, the total processing time of the substrates, can be reduced while reducing the idling state between the time when the substrates are loaded to the substrate processing apparatus until the cleaning process ends.

In the following, a substrate processing apparatus according to the embodiments of the invention will be described based on the drawings. In the following, a chemical mechanical polishing (CMP) apparatus is described as an example of the substrate processing apparatus. However, specific examples of the substrate processing apparatus is not limited to the CMP apparatus.

<Substrate Processing Apparatus>

FIG. 1 is a plan view illustrating an overall configuration of a substrate processing apparatus according to an embodiment. As shown in FIG. 1, the substrate processing apparatus includes a housing 1 in a substantially rectangular shape, and a load/unload unit 2, a polishing unit 3, and a cleaning unit 4 are defined by partition walls 1a, 1b inside the housing 1. The load/unload unit 2, the polishing unit 3, and the cleaning unit 4 are respectively independently assembled and independently evacuated. In addition, the substrate processing apparatus has a control device 5 for controlling the substrate processing apparatus.

The control device 5 has a computer 5c having a processor 5a and a storage device 5b. The storage device 5b stores programs, data, etc. The storage device 5b includes a storage medium readable by the processor 5a of the computer 5c. Examples of the storage medium include a read-only memory (ROM), etc. The control device 5 executes control processes related to the substrate processing apparatus by operating the processor 5a based on program commands stored in the storage device 5b.

<Load/Unload Unit>

The load/unload unit 2 includes two or more (four in the embodiment) front load parts 20 on which a substrate cassette that stocks multiple substrates is placed. The front load parts 20 are disposed to be adjacent to the housing 1, and are arranged along the width direction (a direction perpendicular to the longitudinal direction) of the substrate processing apparatus. The front loading units 20 can be loaded with a carrier for storing substrates, such as an open cassette, a standard manufacturing interface (SMIF) pod, or a front opening unified pod (FOUP). Here, the SIMF, FOUP is a closed container capable of accommodating a substrate cassette inside and maintaining an environment independent from the external space by being covered with partition walls.

In addition, the load/unload unit 2 includes an in-line thickness monitor (ITM) 24 as a measurement device measuring film thickness on a substrate surface. In addition, on the load/unload unit 2, a transport robot 22 movable along the row of the front load parts 20 is disposed. The transport robot 22 is able to access the substrate cassette mounted on the front load part 20. Each transport robot 22 includes two hands on the upper and lower sides. The upper-side hand is used when the processed substrate is returned to the substrate cassette. The lower-side hand is used when the substrate before being processed is taken out from the substrate cassette. In addition, the lower-side hand of the transport robot 22 is configured to be able to turn over the substrate by rotating around its axis.

Since the load/unload unit 2 is a region that needs to be maintained in the cleanest state, the inside of the load/unload unit 2 is always maintained at a pressure higher than any one of the outside of the substrate processing apparatus, the polishing unit 3, and the cleaning unit 4. The polishing unit 3 is the dirtiest region because the polishing unit 3 uses slurry as a polishing liquid. Therefore, a negative pressure is formed inside the polishing unit 3, and such pressure is maintained to be lower than the internal pressure of the cleaning unit 4. In the load/unload unit 2, a filter fan unit (not shown) having a clean air filter, such as a HEPA filter, a ULPA filter, or a chemical filter is provided, and clean air from which particles, toxic vapors, and toxic gases have been removed is constantly blown out from the filter fan unit.

<Polishing Unit>

The polishing unit 3 is a region in which polishing (planarization) of a substrate is performed, and includes a first polishing device 3A (Poli. A), a second polishing device 3B (Poli. B), a third polishing device 3C (Poli. C), and a fourth polishing device 3D (Poli. D). The first polishing device 3A, the second polishing device 3B, the third polishing device 3C, and the fourth polishing device 3D, as shown in FIG. 1, are arranged along the longitudinal direction of the substrate processing apparatus.

The first polishing device 3A includes: a polishing table to which a polishing pad is attached; a top ring for holding a substrate and pressing the substrate against the polishing pad on the polishing table while polishing; a polishing liquid supply nozzle for supplying the polishing liquid or a dressing liquid (e.g., pure water) to the polishing pad; a dresser for dressing a polishing surface of the polishing pad; and an atomizer that atomizes and sprays a mixed fluid of a liquid (e.g., pure water) and a gas (e.g., nitrogen gas) or a liquid (e.g., pure water) to the polishing surface. The second polishing device 3B, the third polishing device 3C, and the fourth polishing device 3D have the same configurations as the first polishing device 3A.

<Transport Unit>

Then, the transport unit (transport mechanism) for transporting the substrate is described. As shown in FIG. 1, a first linear transporter 6 is disposed in adjacency with the first polishing device 3A and the second polishing device 3B. The first linear transporter 6 is a mechanism that transports substrates among four transport positions (a first transport position LTP1, a second transport position LTP2, a third transport position LTP3, and a fourth transport position LTP4 in order from the load/unload unit side) in a direction in which the first polishing device 3A and the second polishing device 3B are arranged.

In addition, a second linear transporter 7 is disposed in adjacency with the third polishing device 3C and the fourth polishing device 3D. The second linear transporter 7 is a mechanism that transports substrates among three transport positions (a fifth transport position LTP5, a sixth transport position LTP6, and a seventh transport position LTP7 in order from the load/unload unit side) in a direction in which the third polishing device 3C and the fourth polishing device 3D are arranged.

A substrate is transported to the first polishing device 3A and the second polishing device 3B by the first linear transporter 6. The top ring of the first polishing device 3A moves between the polishing position and the second transport position LTP2 through a swing operation of a top ring head. Therefore, the transfer of the substrate to the top ring is performed at the second transport position LTP2. Likewise, the top ring of the second polishing device 3B moves between the polishing position and the third transport position LTP3, and the transfer of the substrate to the top ring is performed at the third transport position LTP3. The top ring of the third polishing device 3C moves between the polishing position and the sixth transport position LTP6, and the transfer of the substrate to the top ring is performed at the sixth transport position LTP6. The top ring of the fourth polishing device 3D moves between the polishing position and the seventh transport position LTP7, and the transfer of the substrate to the top ring is performed at the seventh transport position LTP7.

A lifter 11 for receiving a substrate from the transport robot 22 is disposed at the first transport position LTP1. The substrate is delivered from the transport robot 22 to the first linear transporter 6 via the lifter 11. A shutter (not shown) is provided on the partition wall 1a and located between the lifter 11 and the transport robot 22, and, at the time of transporting a substrate, the shutter is opened and the substrate is delivered from the transport robot 22 to the lifter 11. In addition, a swing transporter (STP) 12 is disposed among the first linear transporter 6, the second linear transporter 7, and the cleaning unit 4. The swing transporter 12 has a hand movable between the fourth transport position LPT4 and the fifth transport position LTP5, and the transfer of a substrate from the first linear transporter 6 to the second linear transporter 7 is performed by the swing transporter 12. The substrate is transported to the third polishing device 3C and/or the fourth polishing device 3D by the second linear transporter 7. In addition, a substrate polished by the polishing unit 3 is transported to the cleaning unit 4 via the swing transporter 12. In addition, a temporary substrate placement table (WS1) 180 is provided at the transport unit.

It is noted that the above-described first linear transporter 6, second linear transporter 7, transport robot 22, lifter 11, and swing transporter 12 and transport robots RB1U, RB1L, RB2 to be described afterwards merely serve as an example of a "transport device" for performing a transport process on a substrate.

<Cleaning Unit>

In the cleaning unit 4, a first cleaning chamber 190, a first transport chamber 191, a second cleaning chamber 192, a second transport chamber 193, and a third cleaning chamber 194 are defined. In the first cleaning chamber 190, two cleaning devices CL1A, CL1B and a temporary substrate placement table WS2 are disposed. In the second cleaning chamber 192, two cleaning devices CL2A, CL2B and a temporary substrate placement table WS3 are disposed. In the third cleaning chamber 194, two cleaning devices CL3A, CL3B that clean a substrate are disposed. The cleaning devices CL3A, CL3B are separated from each other. The cleaning devices CL1A, CL1B, CL2A, CL2B, CL3A, CL3B are cleaning machines that clean substrates by using a cleaning solution.

In the first transport chamber 191, the transport robots RB1U, RB1L are disposed, and in the second transport chamber 193, the transport robot RB2 is disposed. The transport robots RB1U, RB1L operate to transport substrates among the temporary placement table 180, the cleaning devices CL1A, CL1B, the temporary placement table WS2, and the cleaning devices CL2A, CL2B. The transport robot RB2 operates to transport substrates among the cleaning devices CL2A, CL2B, the temporary placement table WS3, and the cleaning devices CL3A, CL3B. Since the transport robot RB2 transports only cleaned substrates, the transport robot RB2 includes only one hand. The transport robot 22 takes out substrates from the cleaning devices CL3A, CL3B, and returns the substrates to the substrate cassette.

<Reduction of Substrate Idling State>

In the following, descriptions are made with regard to reducing the substrate idling state from the time when the polishing process is started until the cleaning process ends.

Figure 2:
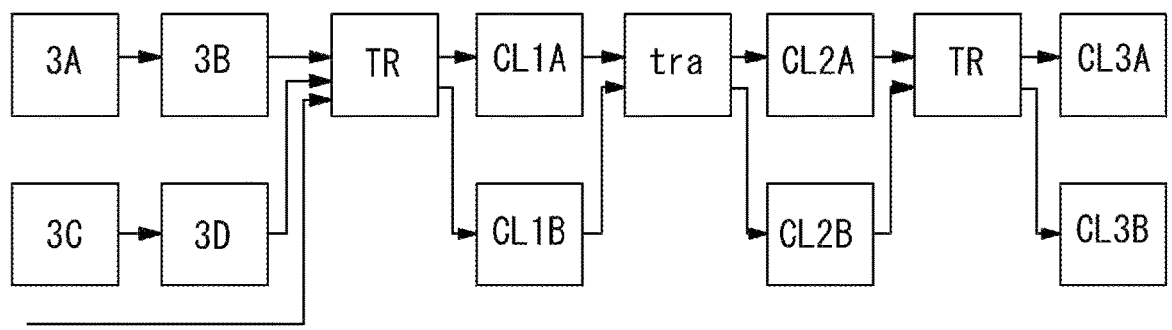
FIG. 2 is a diagram illustrating an example of substrate transport routes from the time when substrates are loaded to the substrate processing apparatus of the embodiment until a cleaning process ends.
Figure 3:
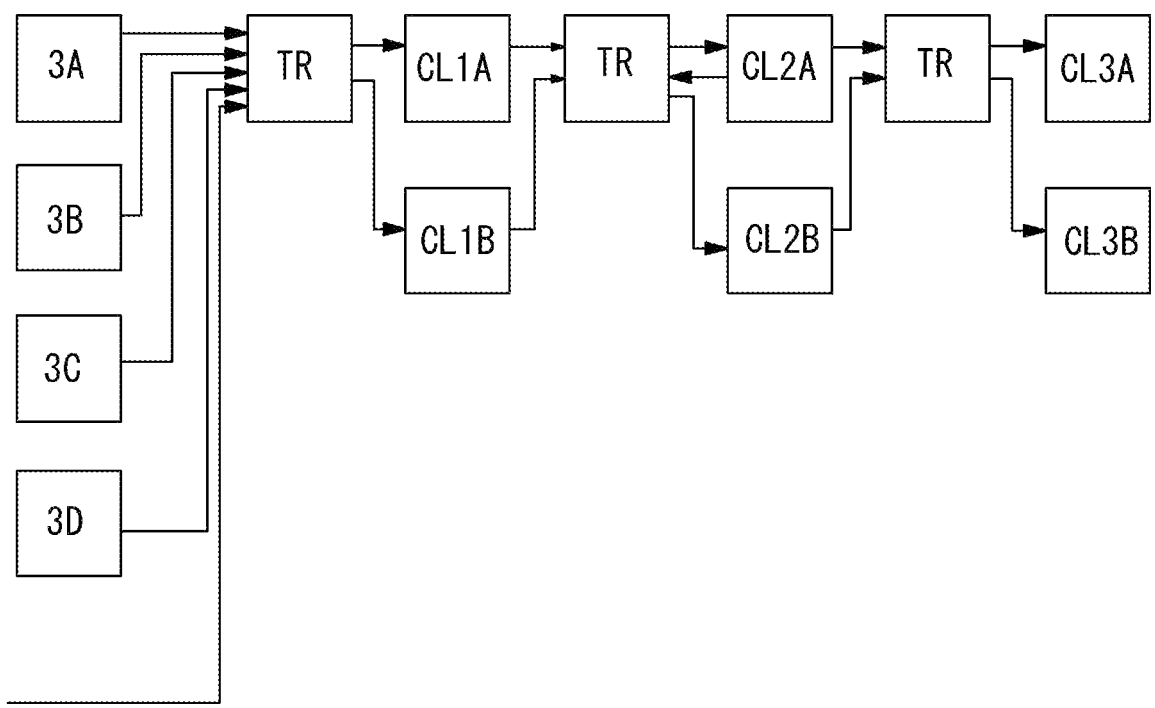
FIG. 3 is a diagram illustrating an example of substrate transport routes from the time when substrates are loaded to the substrate processing apparatus of the embodiment until a cleaning process ends.

Firstly, the reason why the substrate idling state occurs is described. FIGS. 2 and 3 are diagrams illustrating an example of substrate transport routes from the time when substrates are loaded to the substrate processing apparatus until the cleaning process ends. In FIGS. 2 and 3, the description about the transport unit transporting the substrates among the respective processing devices is simplified. In addition, "TR" in FIGS. 2 and 3 refer to "transport".

As shown in FIGS. 2 and 3, in the case where the polishing process and the cleaning process are respectively two systems, the degree of freedom of the substrate transport routes is high. In addition, as shown in FIGS. 2 and 3, a processing recipe with which the cleaning process is performed without performing the polishing process is possible.

In addition, as shown in FIG. 3, a complicated substrate transport route, such as temporarily returning to transport a substrate to the cleaning device CL2B of another system after the cleaning process by using the cleaning device CL2A ends.

In this way, in the case where multiple cleaning devices capable of performing cleaning processes in parallel are provided in the cleaning unit 4, the substrate transport routes in the cleaning unit are complicated, and the substrate idling state may occur in the cleaning unit. Once the substrate idling state occurs in the cleaning unit, the idling state may also occur for scheduled subsequent substrates passing through the place where the substrate is located.

Comparatively, in the embodiment, the control device 5 generates a time table so that the idling state does not occur from the time when the substrates are loaded to the substrate processing apparatus until the cleaning process ends. The time table is a table in which the process end times or the scheduled process end times in the polishing device, the cleaning device, and the transport device are associated for each of multiple substrates loaded to the substrate processing apparatus. The control device 5 controls the timings of loading the substrates to the substrate processing apparatus based on the time table.

Figure 4:
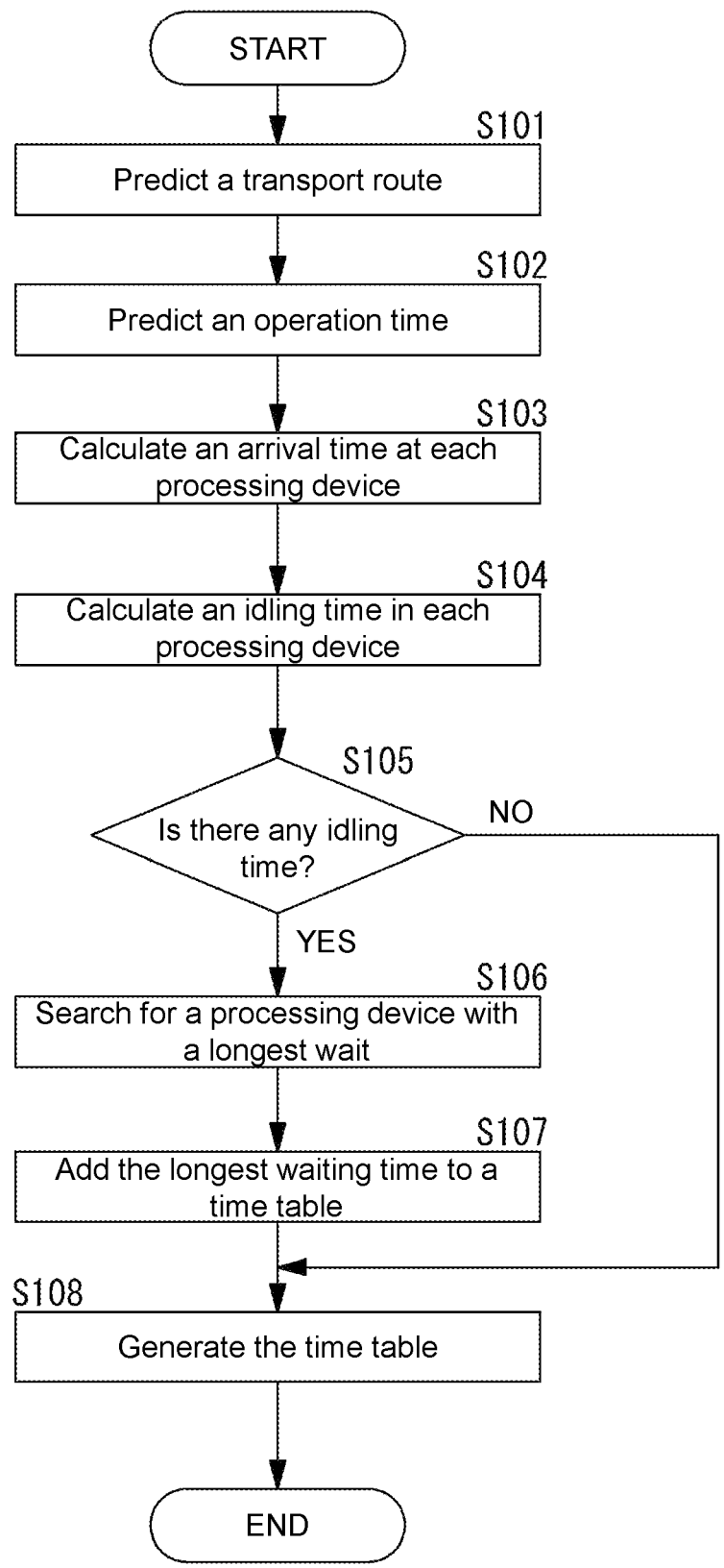
FIG. 4 is an example of a flowchart illustrating an idling state reduction control process according to the embodiment.

Specifically, the control device 5 according to the embodiment executes an idling state reduction control process as described below. FIG. 4 is an example of a flowchart illustrating the "idling state reduction control process" according to the embodiment. Firstly, based on the processing recipe, the control device 5 predicts the transport routes for all of the substrates loaded to the substrate processing apparatus (Step S101).

Specifically, the processing recipe defining the contents of applied processes for each of the substrates loaded to the substrate processing apparatus is prepared in advance and stored in the storage device 5b.

More specifically, the processing recipe defines, for the respective substrates, the types of units to be used, the types of processing devices to be used in the respective units (e.g., the types of polishing devices to be used), and the times (i.e., processing times) required for the processes performed by the processing devices to be used, etc. Specifically, a predicted processing time may be used as the processing time. For example, as the processing time of the polishing device to be used, the predicted time of the polishing process performed by the polishing device to be used can be used. Based on such recipe, the control device 5 predicts the transport routes of all of the substrates loaded to the substrate processing apparatus.

Then, the control device 5 predicts the operation times for all of the substrates loaded to the substrate processing apparatus (Step S102). Specifically, the control device 5 predicts the operation time for each substrate based on the predicted time or a past performance value set in the processing recipe. The prediction of the operation time is used when generating the time table. That is, the control device 5 generates the time table based on the past performance of the time required for the process in at least one of the polishing device and the cleaning device and the time required for the transport process in the transport device from the polishing unit 3 to the cleaning unit 4.

Then, based on the operation time of each substrate predicted in Step S102, the arrival time of each substrate at each processing device (polishing device, transport device, and cleaning device) is calculated (Step S103). Then, the control device 5 calculates the idling time of each substrate in each processing device (Step S104).

Figures 5, 6:
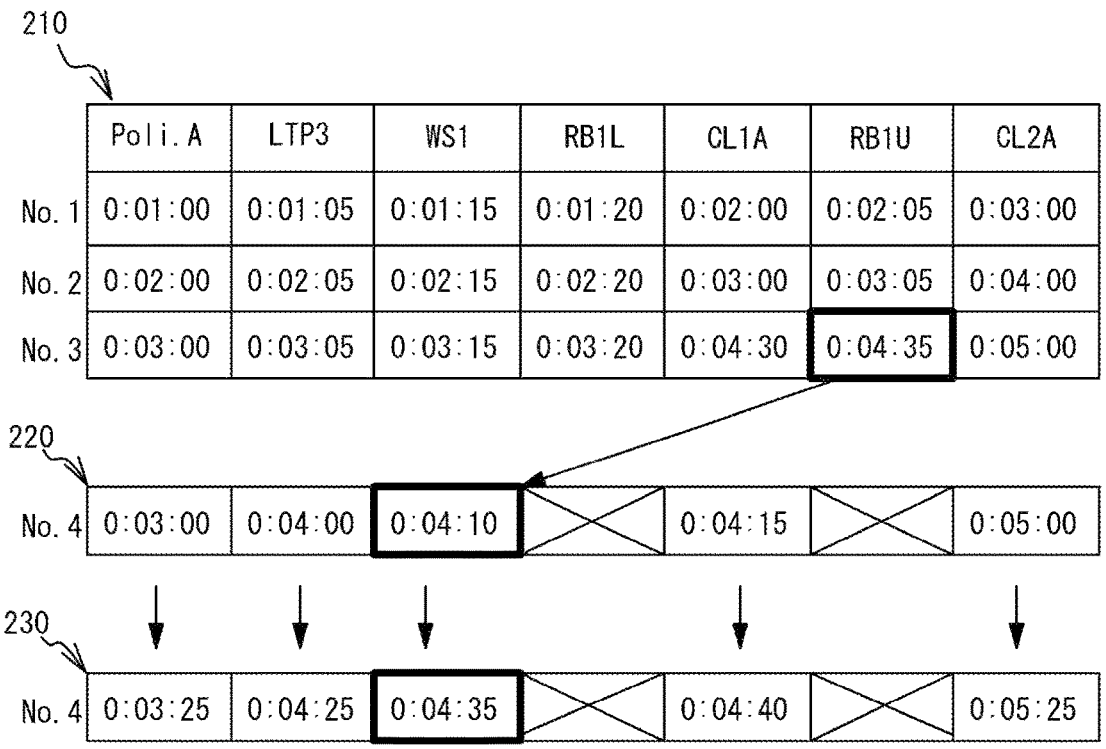
FIG. 5 is a schematic diagram explaining a process for generating a time table.
FIG. 6 is an example of the time table generated in Step S108 of the idling state reduction control process according to the embodiment.

Regarding this point, the description is made with reference to the drawings. FIG. 5 is a schematic diagram for illustrating the process of generating the time table. FIG. 5 illustrates a process in which the time table for Substrates No. 1 to No. 3 has been generated, and the time table for Substrate No. 4 newly loaded to the substrate processing apparatus is generated.

As shown in FIG. 5, in a time table 210, the process end times or the scheduled process end times in the polishing device (Poli. A), the cleaning device (CL1A, CL2A), and the transport device (LTP3, WS1, RB1L, RB1U) are associated for each of Substrates No. 1 to No. 3. Meanwhile, at the time of generating the time table for Substrate No. 4 newly loaded to the substrate processing apparatus, tentative arrival times of Substrate No. 4 that is newly loaded at the polishing device, the cleaning device, and the transport device are calculated. In a tentative arrival time table 220, the scheduled arrival times of Substrate No. 4 at the polishing device (Poli. A), the cleaning device (CL1A, CL2A), and the transport device (LTP3, WS1, RB1L, RB1U) are associated.

The control device 5 compares the tentative arrival times (tentative arrival time table 220) with the process end times or the scheduled process end times (time table 210) of the substrate loaded in advance to the substrate processing apparatus in the polishing device, the cleaning device, and the transport device. In the example, when the scheduled process end time (0:04:35) of Substrate No. 3 in RB1U is compared with the scheduled arrival time (0:04:10) at WS1 as a processing device competing with the process in RB1U, the scheduled arrival time at WS1 is 25 seconds earlier. In other words, in the case where Substrate No. 4 is loaded to the substrate processing apparatus according to the tentative arrival time table 220, Substrate No. 4 may idle at WS1 for 25 seconds. It is noted that competing processing devices refer to processing devices, like WS1 and RB1U, in a relationship in which the operation (receiving the substrate from WS1) of one (RB1U) of the processing devices is required for the operation (transfer for transporting the substrate) of the other processing device (WS1).

As shown in FIG. 4, the control device 5 determines whether there is an idling time (Step S105) and, in the case where there is an idling time (YES in Step S105), searches for a processing device with the longest idling time (Step S106).

For example, in the example of FIG. 5, there is an idling time of 25 seconds between the associated processing devices, which are RB1U of Substrate No. 3 and WS1 of Substrate No. 4. In addition, when the scheduled processing time (0:04:30) of Substrate No. 3 in CL1A is compared with the arrival time (0:04:15) of Substrate No. 4 in CL1A, the scheduled arrival time in CL1A is 15 seconds earlier, so an idling time of 15 seconds occurs.

In this case, the control device 5 recognizes that the longest idling time is 25 seconds, and the processing device with the longest idling time is WS1 of Substrate No. 4. In other words, in the case where there are multiple earlier tentative arrival times (e.g., s 15 seconds and seconds), the control device 5 generates actual arrival times by adding the difference (25 seconds) between the process end time or the scheduled process end time and the tentative arrival time having the greatest difference between the earlier tentative arrival time and the process end time or the scheduled process end time to the tentative arrival times at the polishing device, the cleaning device, and the transport device.

Then, as shown in FIG. 4, the control device 5 adds the longest idling time to the tentative arrival time table 220 to generate an actual arrival time table 230 (Step S107). That is, as shown in FIG. 5, the control device 5 adds the longest idling time (25 seconds) to each processing device in the tentative arrival time table 220. For example, although the arrival time of Substrate No. 4 at LTP3 is 0:04:00 in the tentative arrival time table 220, the arrival time of Substrate No. 4 at LTP3 is 0:04:25 in the actual arrival time table 230. In addition, although the arrival time of Substrate No. 4 at WS1 is 0:04:10 in the tentative arrival time table 220, the arrival time of Substrate No. 4 at WS1 is 0:04:35 in the actual arrival time table 230.

In this way, in the case where the tentative arrival time is earlier than the process end time or the scheduled process end time in the same or competing processing device, the control device 5 generates the actual arrival times by adding the difference between the earlier tentative arrival time and the process end time or the scheduled process end time to the tentative arrival times of the polishing device, the cleaning device, and the transport device.

Then, as shown in FIG. 4, the control device 5 generates a time table (Step S108) based on the actual arrival times (actual arrival time table 230) generated in Step S107 (Step S108). That is, the actual arrival time table 230 is a time table in which the arrival times of Substrate No. 4 at respective processing devices are associated. Therefore, by adding the processing time in each processing device in the actual arrival time table 230, the control device 5 generates a time table in which the process end times or the scheduled process end times of respective processing devices are associated.

Meanwhile, in the case where the control device 5 determines that there is no waiting time in Step S105 (Step S105, NO), the control device 5 does not generate the actual arrival time table 230, but generates a time table based on the tentative arrival time table 220 (Step S108). That is, in the case where there is no tentative arrival time earlier than the process end time or the scheduled process end time in the same or competing processing devices, the control device 5 generates the time table based on the tentative arrival times.

An example of the time table generated in Step S108 of the idling state reduction control process as shown in FIG. 4 is shown in FIG. 6. Specifically, in the time table 240 shown in FIG. 6, the start times (Start) of a series of processes, current positions (Pos) of the substrates, and the process end times or the scheduled process end times in the respective processing devices are associated for Substrates No. 1 to No. 7 loaded to the substrate processing apparatus. The time table 240 is a table provided so that an idling state does not occur from the time when the substrates are loaded to the substrate processing apparatus until the cleaning process ends. The control device 5 controls the timings of loading the substrates to the substrate processing apparatus based on the time table 240.

According to the embodiment as described above, by executing the idling state reduction control process, effects as described in the following can be achieved.

Specifically, according to the embodiment, by calculating the transport times to all the processing devices on the transport paths to generate the time table for all the substrates loaded to the substrate processing apparatus, the transport start timings and the routes are controlled, so that no idling for using the common processing devices occurs among the substrates and the entire work from the time when the polishing starts until the cleaning ends is processed in the shortest possible time without idling. Therefore, the idling times of the substrates in the substrate processing apparatus are reduced. As a result, according to the embodiment, the states of the substrates can be prevented from being unstable due to aging (corrosion, etc.) or disturbance (dust, etc.). Specifically, in the case where the polishing object of the substrate includes copper (Cu), the influence of corrosion increases if the idling time from the time after the polishing ends until the cleaning starts is long. However, by reducing the idling time, the corrosion of copper can be prevented.

In addition, according to the substrate processing apparatus according to the embodiment (specifically, according to the control device 5), for example, in the case where a processing device cannot process a substrate due to maintenance, etc., of some of the processing devices in the substrate processing apparatus, a route that bypasses the processing device under maintenance or the like can be generated.

In addition, the substrate processing apparatus according to the embodiment can appropriately update the time table that is tentatively generated. For example, the control device 5 can calculate the time difference between the actual arrival time and the scheduled arrival time of the substrate at each processing device, and update the time table for a substrate (substrate that are affected) subsequently passing through the processing device. In addition, the control device 5 can also feedback delay information for a substrate having been loaded to the substrate processing apparatus. Meanwhile, in the case where the time difference between the actual arrival time of the substrate and the scheduled arrival time is less than a threshold (e.g., 0.5 seconds, etc.), such time difference is considered as an error, and therefore it is also possible not to feed back the delay information.

In addition, in the substrate processing apparatus according to the embodiment, in the case where the substrate transport is temporarily stopped due to a failure or a transport stop function of the substrate processing apparatus, the control transport can resume by re-generating a time table when the transport starts again. In the case of re-generating a time table, the control device 5 performs from the downstream side of the substrate transport route. In addition, for example, in the case where a substrate loaded to the substrate processing apparatus is removed from the substrate processing apparatus due to a substrate failure, etc., the control device 5 can delete the substrate from the time table, exclude the substrate from the control target, and re-generate the time table.

In addition, in the case where substrates share a processing device, the substrate processing apparatus according to the embodiment performs calculation and exerts control, so that the next substrate is processed after the preceding substrate. However, in the case where the time table can be interrupted without being changed, an interrupted time table can be generated, so that the subsequent substrate can be processed prior to the preceding substrate.

In addition, in the substrate processing apparatus of the embodiment, in the case where the substrate transport route is changed significantly due to maintenance of a processing device, etc., after the tentative time table is generated, it takes a long time to re-generate the time table. Therefore, in such case, the control device 5 can stop loading new substrates until the substrates in the substrate processing apparatus are transported out of the substrate processing apparatus without re-generating the time table. In addition, in the case where it takes a long time to generate or re-generate the time table, the function of generating or re-generating the time table can be switched off.

In addition, the substrate processing apparatus according to the embodiment can visualize the transport states of multiple substrates, so that an operator, etc., can monitor the transport states of the substrates. For example, the control device 5 can display the generated time table on an output interface (monitor, etc.) of the substrate processing apparatus. In addition, the control device can graph the generated time table to display the time table on the output interface in a real-time manner.

In the idling state reduction control process, the order of loading substrates to the substrate processing apparatus is fixed (in other words, it is not configured so that calculation can be performed by changing the order in which the substrates are loaded to the substrate processing apparatus). Therefore, from the perspective of reducing the time from the process of the substrate initially loaded to the substrate processing apparatus starts until the process of the substrate lastly loaded to the substrate processing apparatus ends, that is, reducing the "total processing time" of multiple substrates, there is still room for improvement. Therefore, in the embodiment, a control process (referred to as "total time reduction control process") described below is executed in the embodiment.

<Total Time Reduction Control Process>

Figure 7:
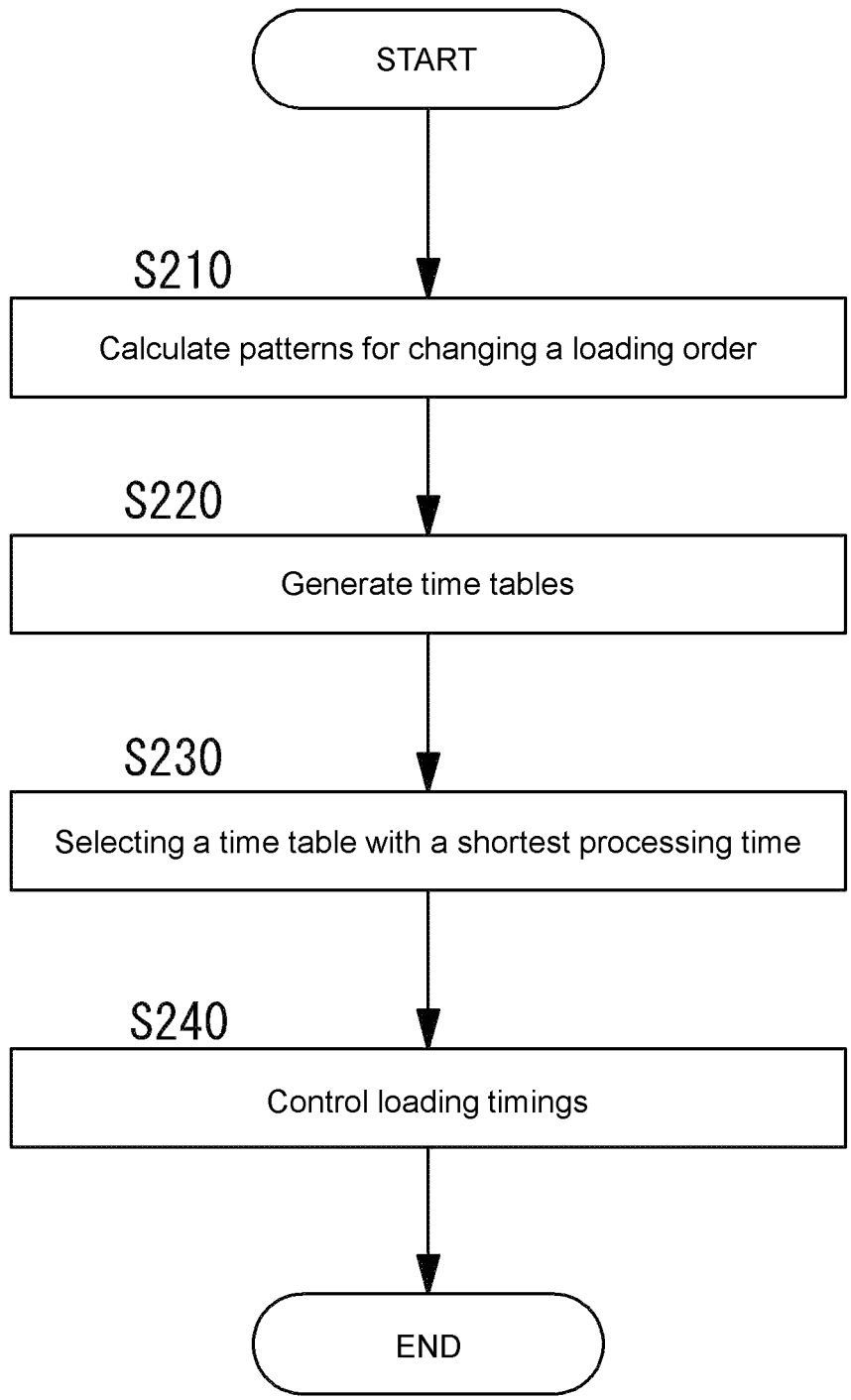
FIG. 7 is an example of a flowchart illustrating a total time reduction control process according to the embodiment.

FIG. 7 is an example of a flowchart illustrating the total time reduction control process according to the embodiment. FIG. 8 is a diagram illustrating an example of a processing recipe of Substrates No. 1 to No. 6 used in the embodiment.

Referring to FIG. 7, firstly, the control device 5 executes a calculation control process according to Step S210. In the calculation control process, the control device 5 calculates the patterns for changing the order in which the substrates are loaded to the substrate processing apparatus for multiple substrates based on a processing recipe in which the processing contents applied to each of the substrates loaded to the substrate processing apparatus are defined in advance.

As a specific example, the control device 5 according to the embodiment calculates all the patterns for changing the order of loading to the substrate processing apparatus for multiple substrates (Substrates No. 1 to No. 6) based on the processing recipe shown in FIG. 8. For example, the control device 5 calculates all the patterns for changing the order of loading to the substrate processing apparatus, such as a "first pattern" of loading the substrates in the order of No. 1→No. 2→No. 3→No. 4→No. 5→No. 6, "second pattern" of loading the substrates in the order of No. 1→No. 3→No. 2→No. 4→No. 5→No. 6, "third pattern" of loading the substrates in the order of No. 1→No. 4→No. 2→No. 3→No. 5→No. 6, etc. In the embodiment, there are 6 factorial combinations ("6×5×4×3×2×1") of the changing patterns. Therefore, in Step S210, changing patterns of 6 factorial are obtained.

It is noted that, in Step S210, the control device 5 may also calculate some of the patterns for changing the loading order, instead of calculating all of the patterns for changing the loading order (in other words, the patterns for changing the loading order are calculated for some of the substrates loaded to the substrate processing apparatus). As an example, it may also be that the order of loading Substrates No. 1 to No. 3 to the substrate processing apparatus has been fixed, and all the patterns in the case of changing the loading order are calculated for Substrates No. 4 to No. 6 only.

Then, the control device 5 executes the time table generation control process according to Step S220. In the time table generation control process, the control device 5 generates a time table in which the process end times in the polishing device, the cleaning device, and the transport device are associated for each pattern calculated in Step S210, so that the idling state does not occur from the time when the substrates are loaded to the substrate processing apparatus until the cleaning process ends.

Specifically, the control device 5 performs the idling state reduction control process (FIG. 4) for each of all the patterns for changing the loading pattern calculated in Step S210. That is, the control device 5 performs the idling state reduction control process for the first pattern, the second pattern, the third pattern, and so on. As a result, in the embodiment, "time tables of 6 factorial" are obtained.

Then, the control device 5 executes a selection control process in Step S230. In the selection control process, the control device 5 selects the time table with the shortest time from the time when the process of the substrate initially loaded to the substrate processing apparatus starts until the process of the substrate that is lastly loaded ends (i.e., "the total processing time of the substrates") in the time tables (time tables of 6 factorial) obtained in Step S220.

Figure 9:
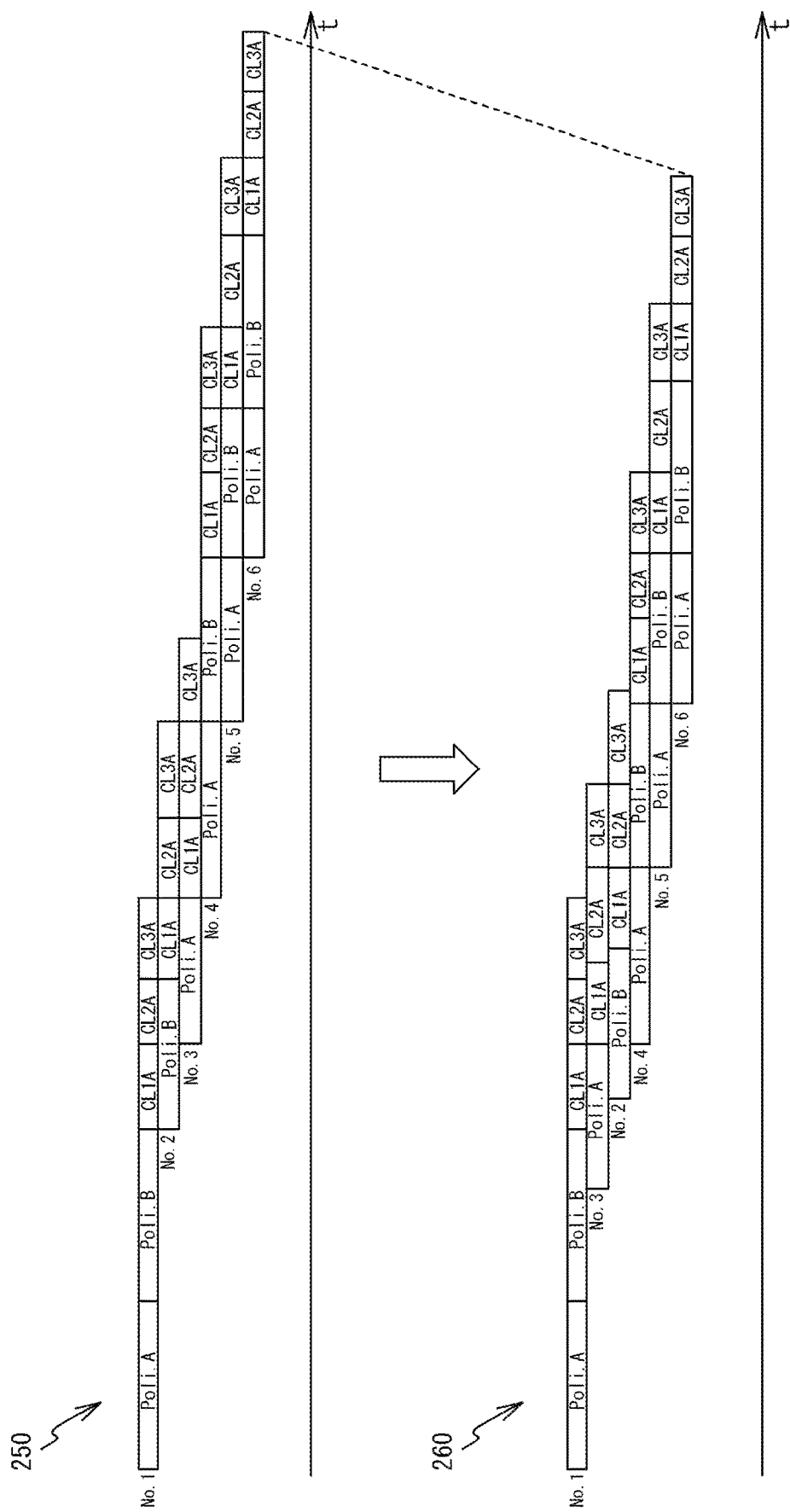
FIG. 9 is a diagram illustrating a time table obtained in Step S230 in the embodiment.

FIG. 9 is a diagram illustrating the time table obtained in Step S230 in the embodiment. Specifically, a time table 260 shown in FIG. 9 is a time table obtained as the result of executing Step S230 according to the embodiment. That is, in the embodiment, in Step S230, the time table 260 is selected as the time table with the shortest total processing time of the substrates.

Then, the control device 5 executes the timing control process according to Step S240. In the timing control process, the control device 5 controls the timings of loading multiple substrates to the substrate processing apparatus based on the time table (time table 260) selected in Step S230. That is, the control device 5 loads Substrates No. 1 to No. 6 to the substrate processing apparatus and applies processes on the substrates in accordance with the time table 260.

Here, in FIG. 9, a time table 250 is also shown. The time table 250 is a time table obtained as a result of executing the idling state reduction control process (FIG. 4) for the case where the substrates are loaded in the order of No. 1→No. 2→No. 3→No. 4→No. 5→No. 6 without executing Step S210 for Substrates No. 1 to No. 6 shown in FIG. 8. The time table 250 is also a time table obtained according to "the control process disclosed in Patent Document 1".

The time table 250 is a time table with which Substrates No. 1 to No. 6 are loaded to the substrate processing apparatus in this order, so that the same processing device (Poli. A, Poli. B, CL1A to CL3A) is not used at the same time and there is no substrate idling state.

Meanwhile, the time table 260 obtained in Step S230 according to the embodiment is a time table with which the order of loading Substrate No. 2 and Substrate No. 3 in the time table 250 is changed, and the process start times of Substrates No. 2 to No. 6 are adjusted, so that the same processing device (Poli. A, Poli. B, CL1A to CL3A) is not used at the same time and there is no idling time for Substrates No. 2 to No. 6. As can be told by comparing the time table 260 and the time table 250, compared with the time table 250, the total processing time of the substrates is shorter with the time table 260.

As described above, according to the embodiment, the total processing time of the substrates can be reduced, while the substrate idling state from the time when a substrate is loaded to the substrate processing apparatus until the cleaning process ends can be reduced.

A program according to the embodiment is a program for causing the computer 5c to execute the control process according to the embodiment. The description of the program is omitted because it repeats the description of the control process. In addition, the program may also be stored in a storage medium (e.g., a non-transitory storage medium) readable by the computer 5c and transferred.

<Modified Example of the Embodiment>

Following the above, a modified example of the embodiment is described. Firstly, referring to FIG. 1, the four polishing devices of the substrate processing apparatus according to the modified example include multiple polishing devices replaceable with each other. Specifically, in the modified example, Poli. A and Poli. B are polishing devices able to execute polishing processes of the same type and therefore are mutually replaceable. In addition, Poli. C and Poli. D are polishing devices able to execute polishing processes of the same type and therefore are mutually replaceable.

That is, the combination of "Poli. A and Poli. B" can be replaced with the combination of "Poli. C and Poli. D". Conversely, the combination of "Poli. C and Poli. D" can be replaced with the combination of "Poli. A and Poli. B". In the modified example, "Poli. A, Poli. B, Poli. C, Poli. D" are referred to as a "specific polishing device group" formed by multiple polishing devices replaceable with each other.

Figure 10:
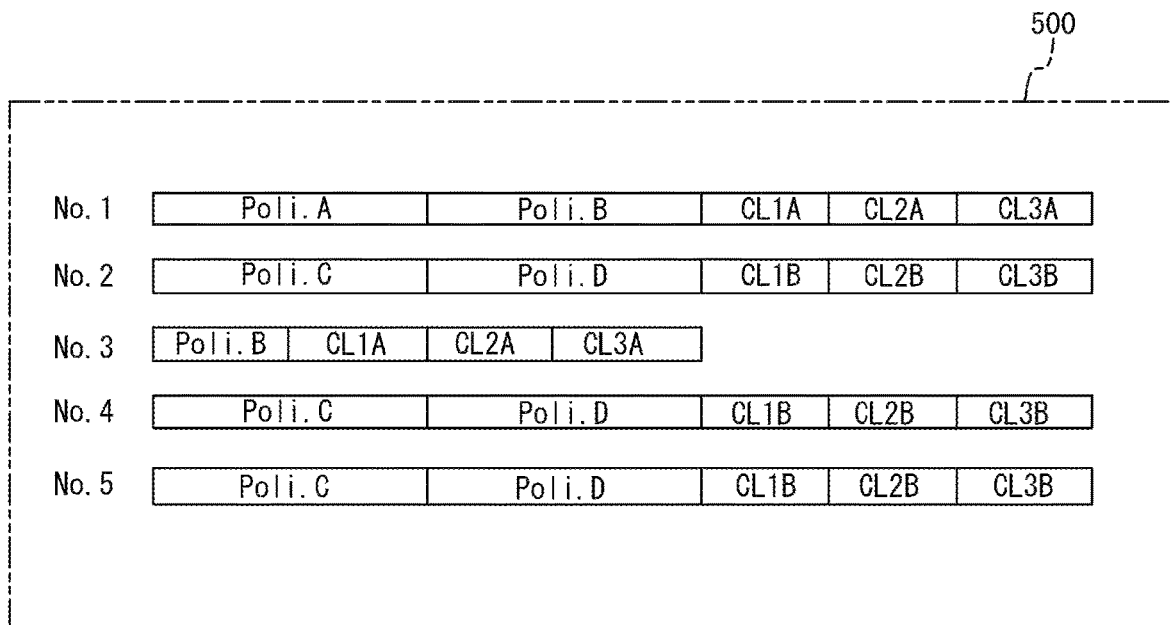
FIG. 10 is a diagram illustrating an example of a processing recipe of Substrates No. 1 to No. 5 used in a modified example of the embodiment.
Figure 10:
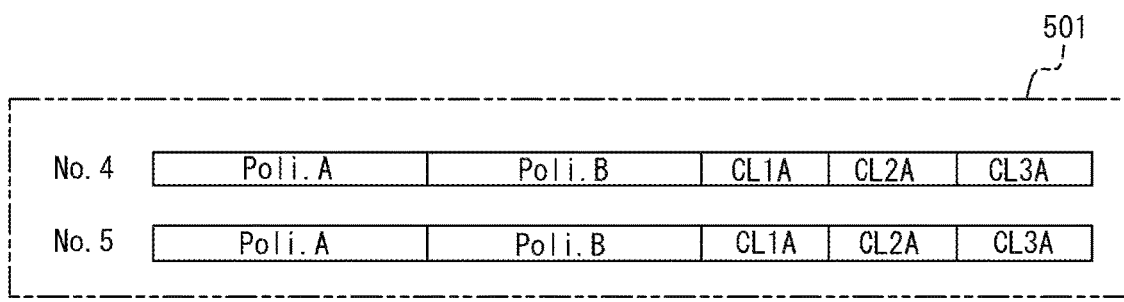

FIG. 10 is a diagram illustrating an example of a processing recipe of Substrates No. 1 to No. 5 used in the modified example. Specifically, in FIG. 10, an example of a processing recipe 500 and an additional processing recipe 501 added thereto is shown.

Referring to FIG. 10, in the processing recipe 500 according to the modified example, the applied processing contents of some of the substrates loaded to the substrate processing apparatus include polishing processes performed by the specific polishing device group. Specifically, in the processing recipe 500, the applied processing contents of Substrates No. 1, No. 2, No. 4, and No. 5 include polishing processes performed by the specific polishing device group (Poli. A to Poli. D). Meanwhile, since only the polishing device Poli. B is used, Substrate No. 3 does not include a polishing process performed by the specific polishing device group in the applied processing contents.

Figure 11:
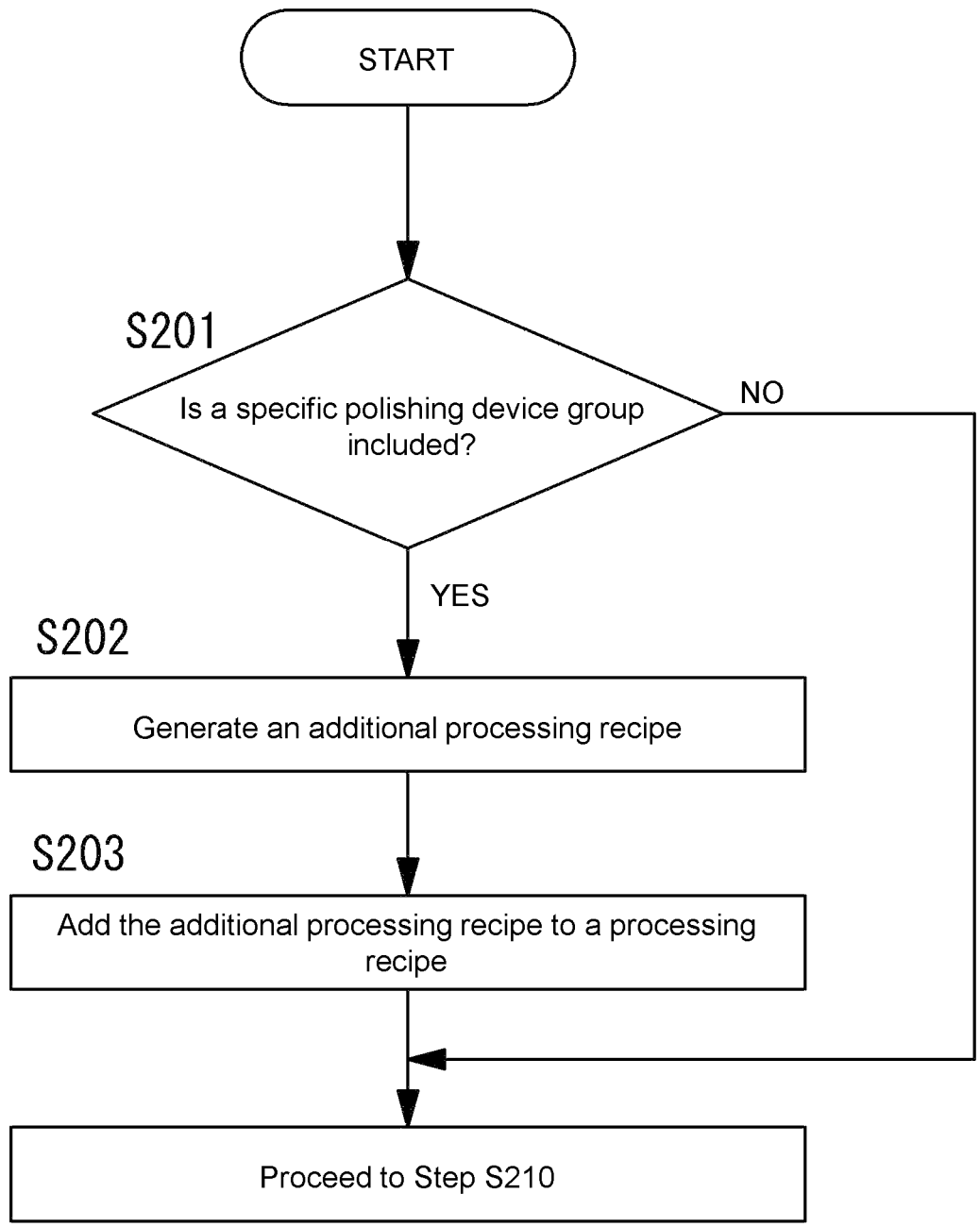
FIG. 11 is an example of a flowchart illustrating a control process (processing recipe change control process) according to a modified example of the embodiment.

FIG. 11 is an example of a flowchart illustrating a control process (referred to as "processing recipe change control process" in the following) according to the modified example. The flowchart of FIG. 11 is executed before Step S210 in FIG. 7 is executed. Firstly, the control device 5 according to the modified example determines whether, in the processing recipe 500, "some" of the substrates loaded to the substrate processing apparatus include a polishing process performed by the specific polishing device group in the applied processing contents (Step S201).

In the case of being determined as "NO" in Step S201, that is, in the case where "all" of the substrates loaded to the substrate processing apparatus include a polishing process performed by the specific polishing device group in the applied processing contents or the substrates loaded to the substrate processing apparatus do not include a polishing process performed by the specific polishing device group at all in the applied processing contents, the control device 5 executes Step S210, but does not execute Steps S202, S203.

Meanwhile, in the case of being determined as "YES" in Step S201 (i.e., some of the substrates loaded to the substrate processing apparatus include a polishing process performed by the specific polishing device group in the applied processing contents), the control device 5 executes Step S202.

In Step S202, the control device 5 generates the additional processing recipe 501 defining the processing contents in the case where multiple polishing devices (Poli. C and Poli. D in FIG. 10) in the specific polishing device group are replaced with other multiple polishing devices (Poli. A and Poli. B) for substrates (Substrates No. 4 and No. 5) loaded after the substrate (Substrate No. 3 in FIG. 10) whose processing contents do not include a polishing process performed by the specific polishing device group among the substrates loaded to the substrate processing apparatus (Step S202).

In the case where the cleaning device used for each polishing device is defined, in Step S202, when the polishing devices (Poli. C and Poli. D) are replaced with the polishing devices (Poli. A and Poli. B), the cleaning devices may also be replaced with the cleaning devices (CL1A, CL2B, CL1A) used for the polishing devices (Poli. A and Poli. B) (see the additional processing recipe 501). Also, in the case where the transport device used for each polishing device is also defined, when the polishing devices (Poli. C and Poli. D) are replaced with the polishing devices (Poli. A and Poli. B), the transport devices may also be replaced with the transport devices used for the polishing devices (Poli. A and Poli. B).

In addition, in Step S202, assuming that there is no substrate including a polishing process performed by the specific polishing device group after the substrate (Substrate No. 3 in FIG. 10) that does not include a polishing process performed by the specific polishing device group, the control device 5 may interrupt the execution of Step S202 and perform the calculation control process according to Step S210.

After Step S202, the control device 5 adds the additional processing recipe 501 generated in Step S202 to the processing recipe 500 (Step S203).

Then, the control device 5 performs the calculation control process according to Step S210 based on the processing recipe (the processing recipe combining the processing recipe 500 and the additional processing recipe 501 of FIG. 10) after the additional processing recipe 501 is added.

According to the above, the control device 5 according to the modified example uses the processing recipe in which the additional processing recipe 501 of Substrates No. 4 and No. 5 is added to the processing recipe 500 of Substrates No. 1 to No. 5 as shown in FIG. 10 to perform the calculation control process according to Step S210. After Step S210, the control device 5 performs Steps S220, S230, and S240 as described above.

Figure 12:
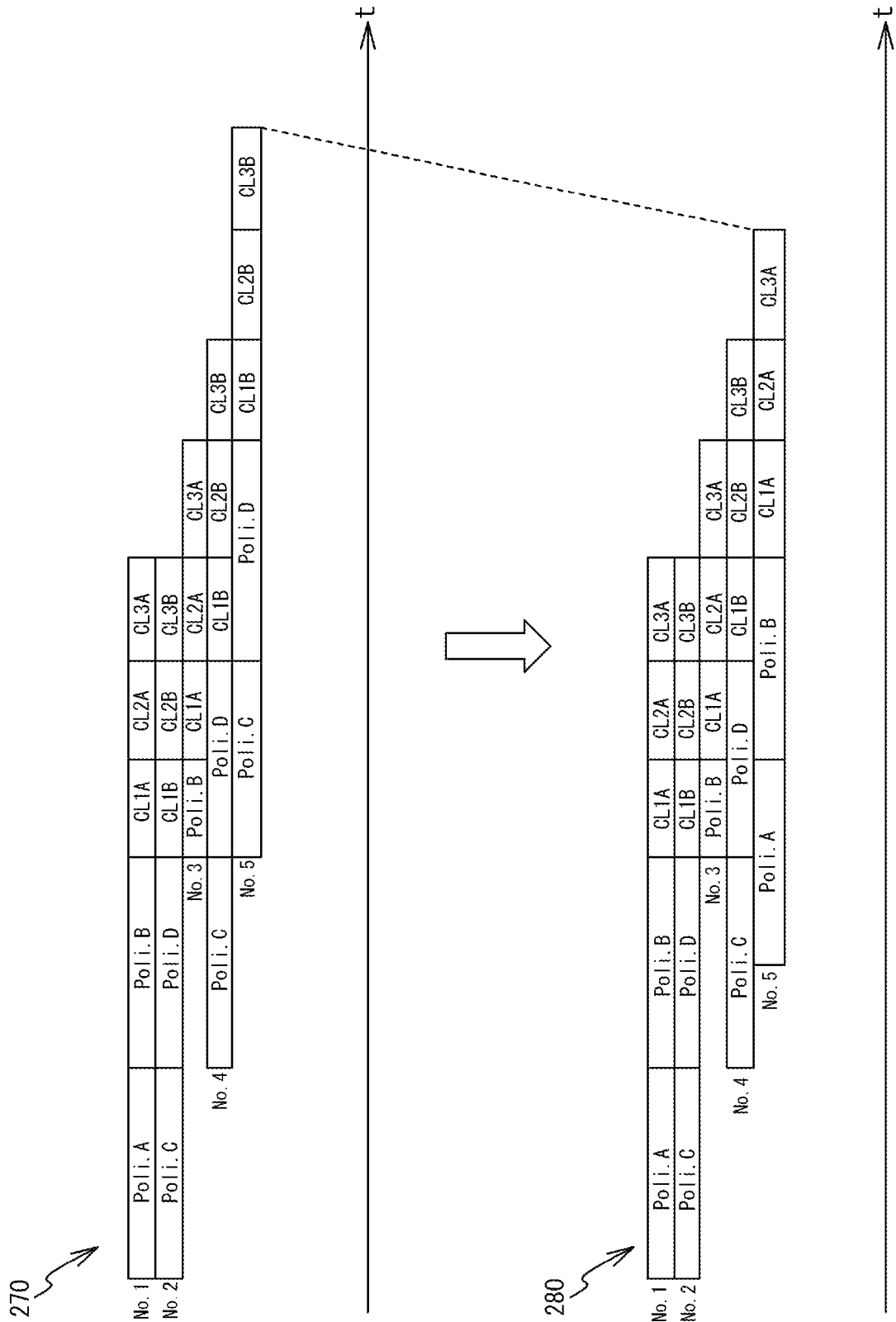
FIG. 12 is a diagram illustrating a time table obtained in Step S230 according to a modified example of the embodiment.

FIG. 12 is a diagram illustrating the time table obtained in Step S230 in the modified example. Specifically, a time table 280 shown in FIG. 12 is a time table obtained in Step S230 according to the modified example. That is, the time table 280 is a time table obtained as a result of performing Steps S210, S220, S230 by using the processing recipe in which the additional processing recipe 501 is added to the processing recipe 500 of FIG. 10. It is noted that, in the modified example, the processing recipe of Substrate No. 5 of the additional processing recipe 501 is used for Substrate No. 5 of the time table 280.

Meanwhile, a time table 270 obtained as a result of using the processing recipe 500 of FIG. 10 and performing the idling state reduction control process (FIG. 4) is also shown in FIG. 12. The time table 270 is also a time table obtained according to the control process disclosed in Patent Document 1. As can be told by comparing the time table 270 and the time table 280 in FIG. 12, compared with the time table 270, the total processing time of the substrates is shorter with the time table 280 obtained in the modified example.

According to the modified example described above, the additional processing recipe in the case where multiple polishing devices included in the specific polishing device group are replaced with other polishing devices is further considered, and the total processing time of the substrates can be reduced.

A program according to the modified example is a program for causing the computer 5c to execute the control process according to the modified example of the embodiment. The description of the program is omitted because it repeats the description of the control process. In addition, the program may also be stored in a storage medium readable by the computer 5c and transferred.

The embodiments and modifications of the invention have been described in detail above. However, the invention is not limited to such specific embodiments and modifications, and various modifications and changes are possible within the scope of the invention described in the claims.

What is claimed is:

1. A substrate processing apparatus, comprising:
   a polishing unit, comprising at least one polishing device that performs a polishing process on a substrate;
   a cleaning unit, comprising at least one cleaning device that performs a cleaning process on the substrate polished by the polishing unit;
   a transport unit, comprising at least one transport device that performs a transport process on the substrate; and
   a control device, controlling the substrate processing apparatus,
   wherein the control device is configured to execute:
   a calculation control process, calculating patterns for changing an order of loading to the substrate processing apparatus for a plurality of substrates loaded to the substrate processing apparatus based on a processing recipe in which processing contents applied to each of the substrates loaded to the substrate processing apparatus are defined in advance;
   a time table generation control process, generating, for each of the patterns obtained in the calculation control process, a time table in which process end times in the polishing device, the cleaning device, and the transport device are associated, so that an idling state does not occur from a time when the substrates are loaded to the substrate processing apparatus until a cleaning process ends;
   a selection control process, selecting a time table with a shortest time from a time when a process of a substrate initially loaded to the substrate processing apparatus starts until a process of a substrate that is lastly loaded ends in the time tables obtained in the time table generation control process; and
   a timing control process, controlling timings of loading the substrates to the substrate processing apparatus based on the time table selected in the selection control process.

2. The substrate processing apparatus as claimed in claim 1, wherein the at least one polishing device comprises a plurality of polishing devices able to execute polishing processes of a same type,
   the polishing devices comprise a specific polishing device group formed by a plurality of polishing devices replaceable with each other,
   in the processing recipe, in a case where some of the substrates loaded to the substrate processing apparatus comprise a polishing process performed by the specific polishing device group in applied processing contents, the control device is configured to execute a processing recipe change control process, and
   in the processing recipe change control process, the control device is configured to:
   generate an additional processing recipe defining processing contents in a case where a plurality of polishing devices comprised in the specific polishing device group are replaced by another plurality of polishing devices for a substrate loaded to the substrate processing apparatus after a substrate in which processing contents applied to the substrate do not comprise the polishing process performed by the specific polishing device group among the substrates loaded to the substrate processing apparatus,
   add the additional processing recipe that is generated to the processing recipe, and
   the control device is configured to perform the calculation control process based on a processing recipe obtained in the processing recipe change control process.

3. The substrate processing apparatus as claimed in claim 1, wherein, in the time table generation control process, the control device is configured to generate the time table based on past performance of a time required for a process in at least one of the polishing device and the cleaning device and a time required for a transport process in the transport device from the polishing unit to the cleaning unit.

4. The substrate processing apparatus as claimed in claim 1, wherein in the time table generation control process, at a time of generating the time table for a substrate newly loaded to the substrate processing apparatus, the control device is configured to:
   calculate tentative arrival times of the newly loaded substrate at the polishing device, the cleaning device, and the transport device, and compare the tentative arrival times with process end times or scheduled process end times of a substrate loaded in advance to the substrate processing apparatus in the polishing device, the cleaning device, and the transport device,
   in a case where there is a tentative arrival time earlier than the process end time or the scheduled process end time in a same or competing processing device, generate actual arrival times by adding a difference between the earlier tentative arrival time and the process end time or the scheduled process end time to the tentative arrival times at the polishing device, the cleaning device, and the transport device, and
   generate the time table based on the actual arrival times.

5. The substrate processing apparatus as claimed in claim 4, wherein in the time table generation control process, in a case where there is no tentative arrival time earlier than the process end time or the scheduled process end time in the same or competing processing device, the control device is configured to generate the time table based on the tentative arrival times.

6. A non-transitory computer readable medium, storing a program, the program causing a computer to execute a control process, and the control process comprising:
   a calculation control process, calculating patterns for changing an order of loading to a substrate processing apparatus for a plurality of substrates loaded to the substrate processing apparatus based on a processing recipe in which processing contents applied to each of the substrates loaded to the substrate processing apparatus are defined in advance;
   a time table generation control process, generating, for each of the patterns obtained in the calculation control process, a time table in which process end times in a polishing device, a cleaning device, and a transport device provided in the substrate processing apparatus are associated, so that an idling state does not occur from a time when the substrates are loaded to the substrate processing apparatus until a cleaning process ends;

a selection control process, selecting a time table with a shortest time from a time when a process of a substrate initially loaded to the substrate processing apparatus starts until a process of a substrate that is lastly loaded ends in the time tables obtained in the time table generation control process; and a timing control process, controlling timings of loading the substrates to the substrate processing apparatus based on the time table selected in the selection control process.

* * * * *